Figure 1:
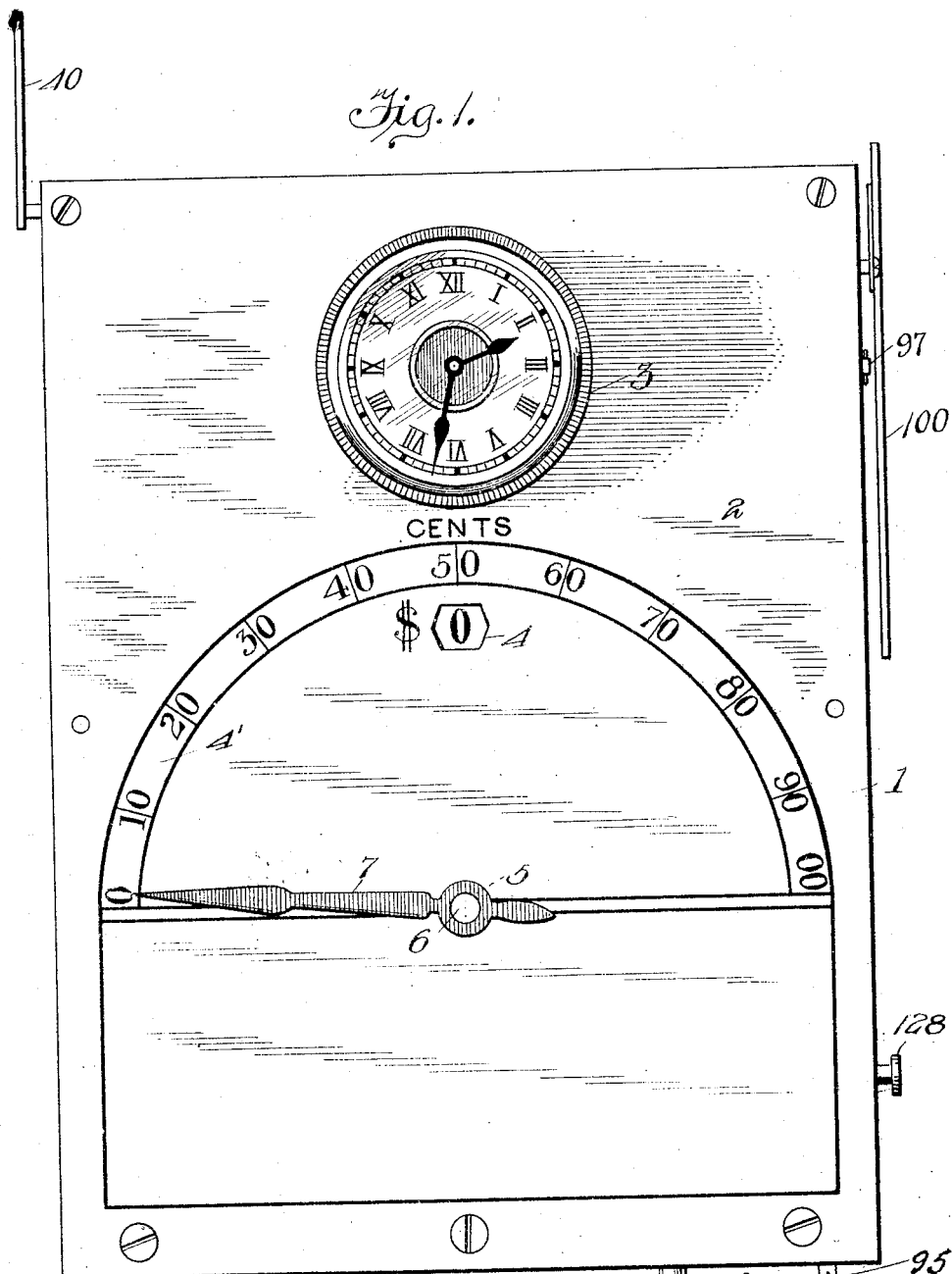

J. G. MacPHERSON.
TAXIMETER.
APPLICATION FILED OCT. 8, 1909.

957,073.

Patented May 3, 1910.
10 SHEETS—SHEET 1.

Witnesses
G. M. Spring
H. Gilbert Dill

Inventor
John G. MacPherson
By David Moore
Attorney

J. G. MacPHERSON.
TAXIMETER.
APPLICATION FILED OCT. 8, 1909.

957,073.

Patented May 3, 1910.
10 SHEETS—SHEET 5.

WITNESSES
D. M. Spring
H. Gilbert Dill

INVENTOR
John G. MacPherson
by Daniel T. Moore
Attorney

J. G. MacPHERSON.
TAXIMETER.
APPLICATION FILED OCT. 8, 1909.
957,073.
Patented May 3, 1910.
10 SHEETS—SHEET 6.
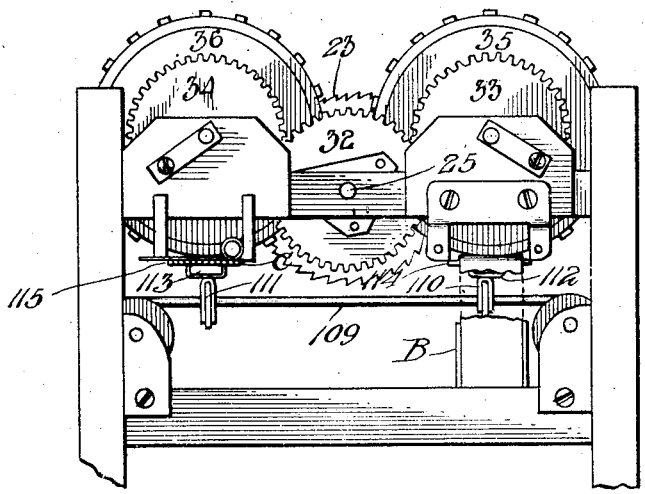
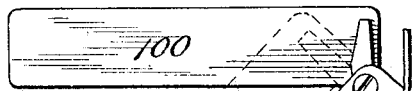
WITNESSES
G. M. Spring
H. Gilbert Dill
INVENTOR
John G. MacPherson,
G. David E. Moore,
Attorney J. G. MacPHERSON.
TAXIMETER.
APPLICATION FILED OCT. 8, 1909.

957,073.

Patented May 3, 1910.
10 SHEETS—SHEET 7.

Witnesses
G. M. Spring
H. Gilbert Dill

Inventor
John G. MacPherson
by David P. Moore
Attorney

J. G. MacPHERSON.
TAXIMETER.
APPLICATION FILED OCT. 8, 1909.
957,073.
Patented May 3, 1910.
10 SHEETS—SHEET 8.
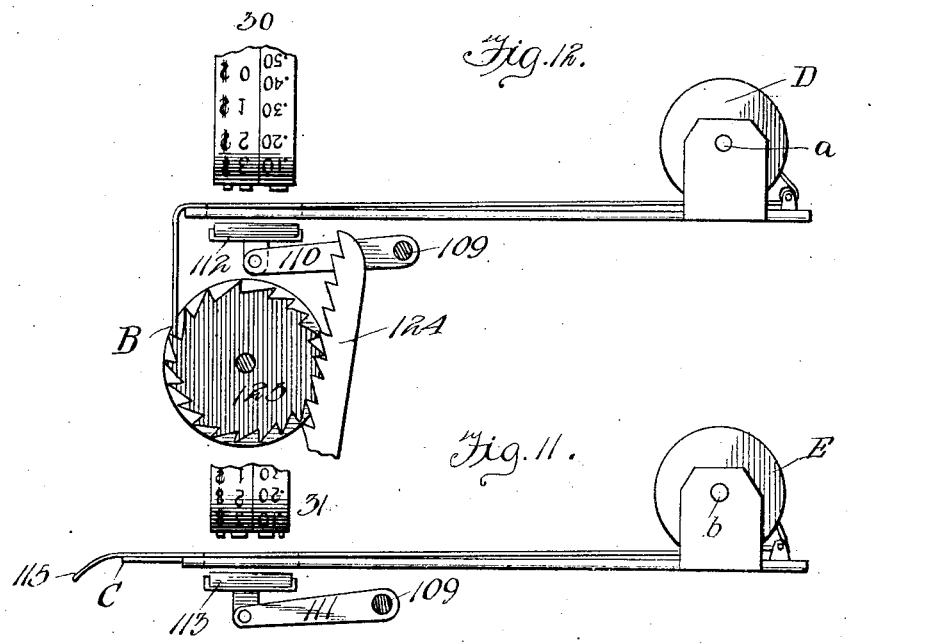
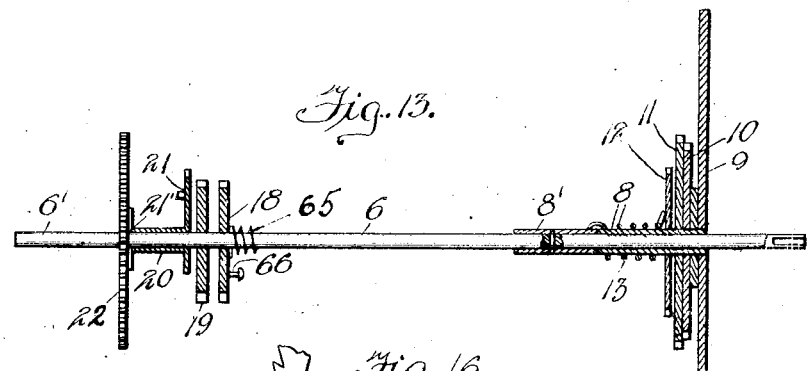
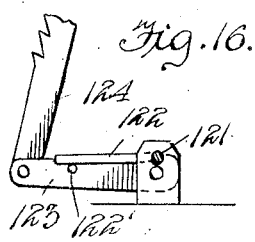
WITNESSES
G. M. Spring
H. Gilbert Dell
INVENTOR
John G. MacPherson
by David S. Moore
Attorney

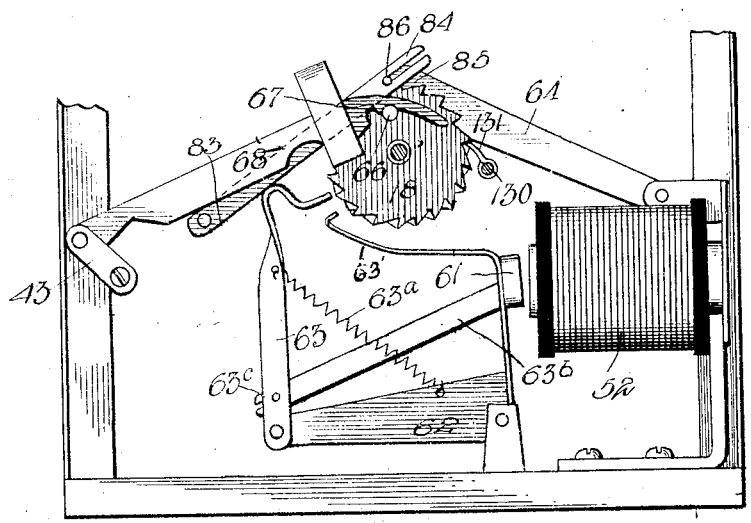
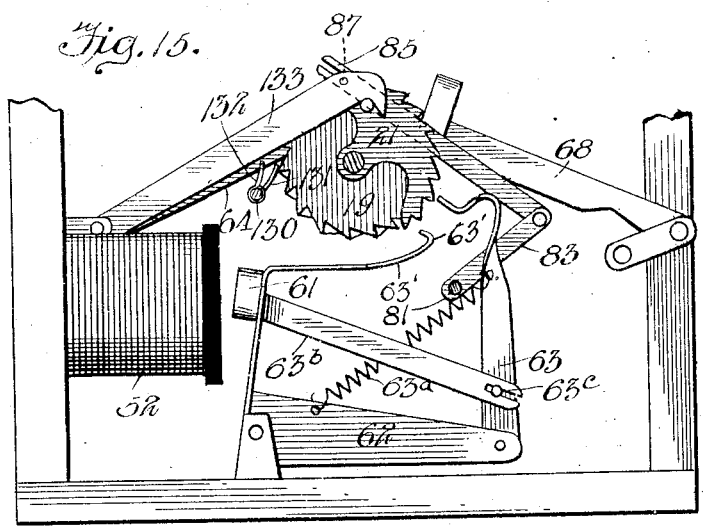

UNITED STATES PATENT OFFICE.

JOHN G. MacPHERSON, OF PHILADELPHIA, PENNSYLVANIA, ASSIGNOR, BY DIRECT AND MESNE ASSIGNMENTS, TO THE MacPHERSON COMPANY, INCORPORATED, A CORPORATION OF DELAWARE.

TAXIMETER.

957,073.      Specification of Letters Patent.      Patented May 3, 1910.

Application filed October 8, 1909. Serial No. 521,777.

*To all whom it may concern:*

Be it known that I, JOHN G. MACPHERSON, a citizen of the United States, residing at Philadelphia, in the county of Philadelphia and State of Pennsylvania, have invented certain new and useful Improvements in Taximeters, of which the following is a specification, reference being had therein to the accompanying drawing.

This invention relates to an improved taximeter, this particular taximeter being provided with mechanisms, which visually exhibit the charge or tax, keep a concealed and untampered record of the trips and the amount of each trip, give to the passenger of each trip a cash ticket of the amount of the ride and according to the tax exhibited, and give warning as to whether the vehicle is for hire, and when engaged whether the passenger is paying for running or waiting time. To accomplish this, I employ a clock, upon the rear end of whose minute hand shaft, I mount two spring contacts, which as the minute hand shaft revolves, form circuits at intervals with metal contacts arranged in two series of different numbers and approximate to the clock. These series are arranged in two circles of different diameters, the larger circle being provided with a greater number of contacts, whereby the different mechanisms are operated more frequently for "running" time rates, than they are operated when the smaller circle with a lesser number of contacts for "waiting" time rates, is operated. By this means, the clock actuates the taxing mechanisms for "running" and "waiting" time rates, when desired, and the ring of insulation containing the two sets of metal contact plates, is in reality, a commutator, except that the contacts of each series are connected so that each contact will close the same respective circuit.

To clearly illustrate my invention, in order that the construction and operation may be fully understood, attention is invited to the accompanying drawings, in which:—

Figure 2:
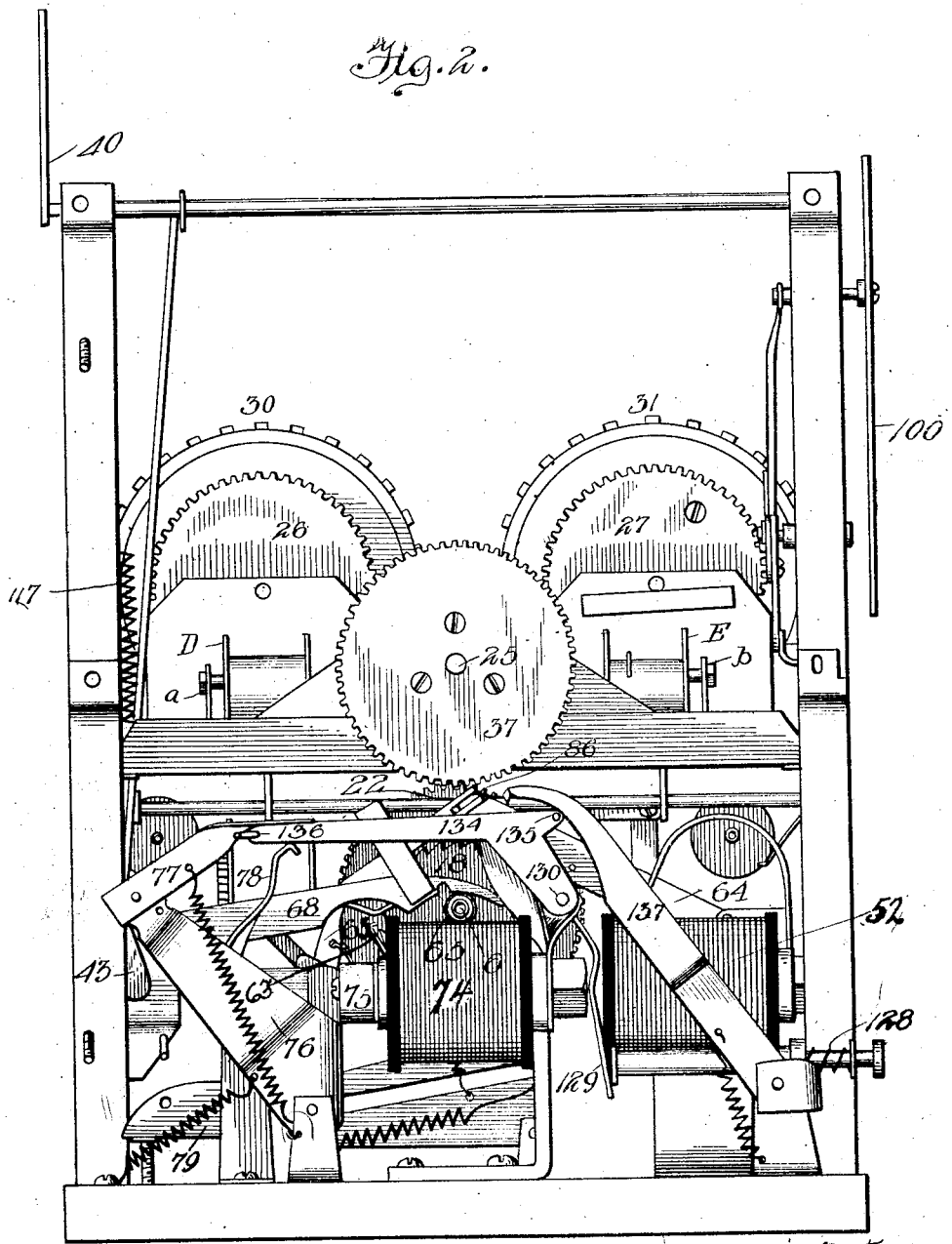
Figure 3:
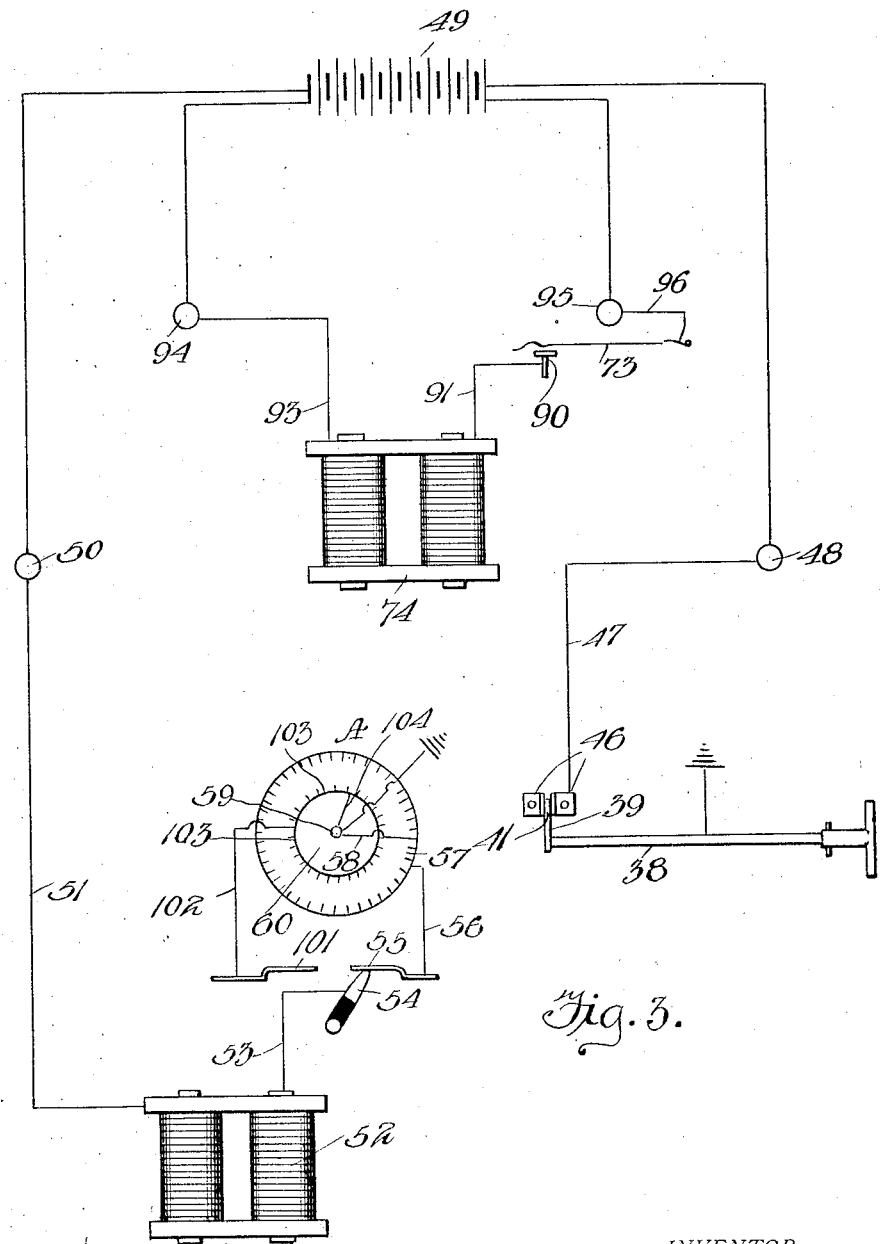
Figure 4:
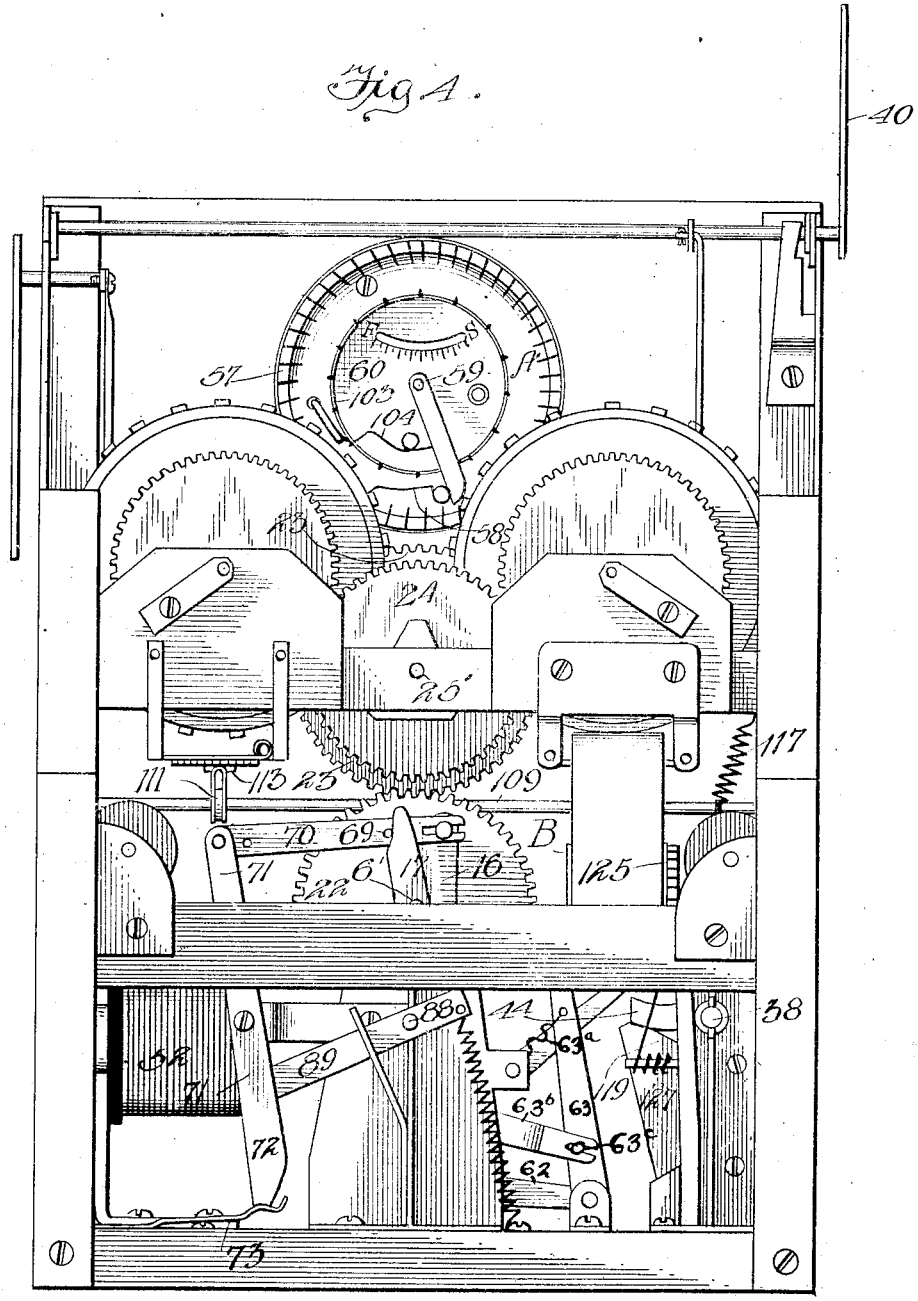
Figure 5:
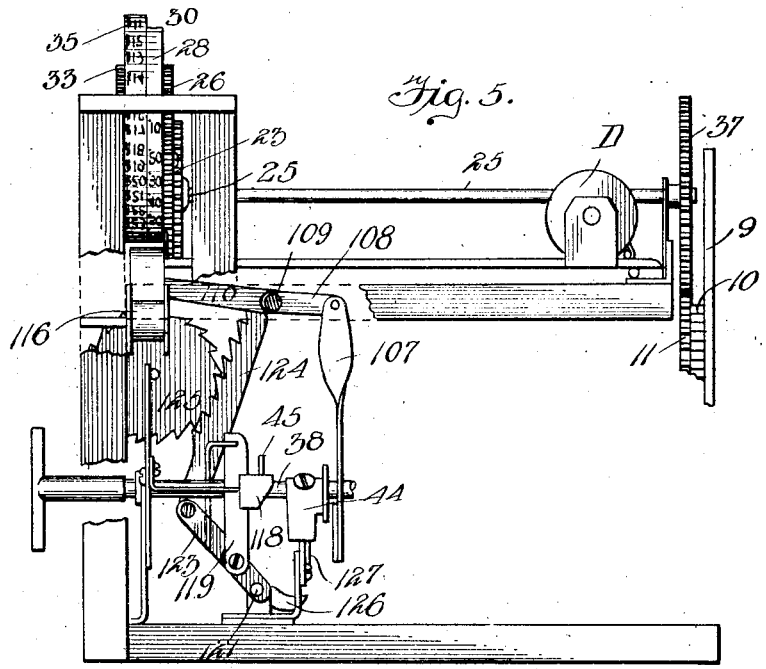
Figure 6:
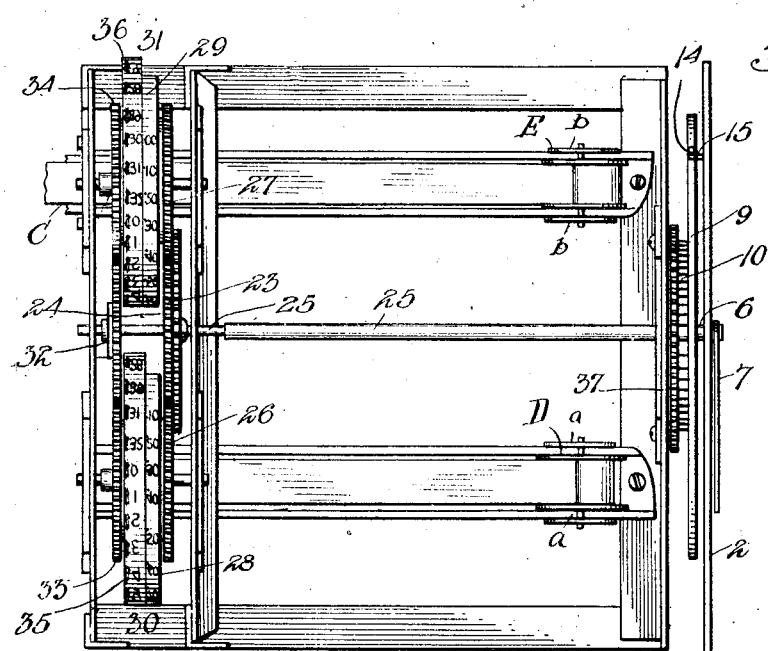
Figure 10:
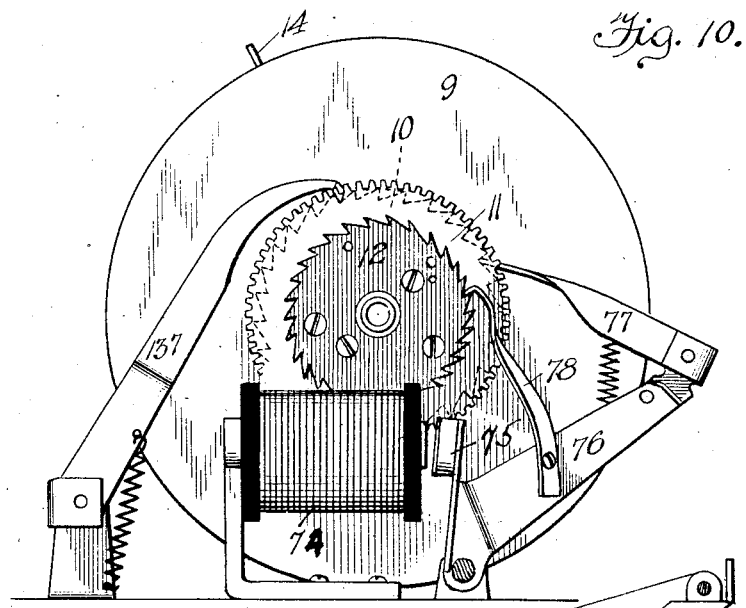
Figure 8:
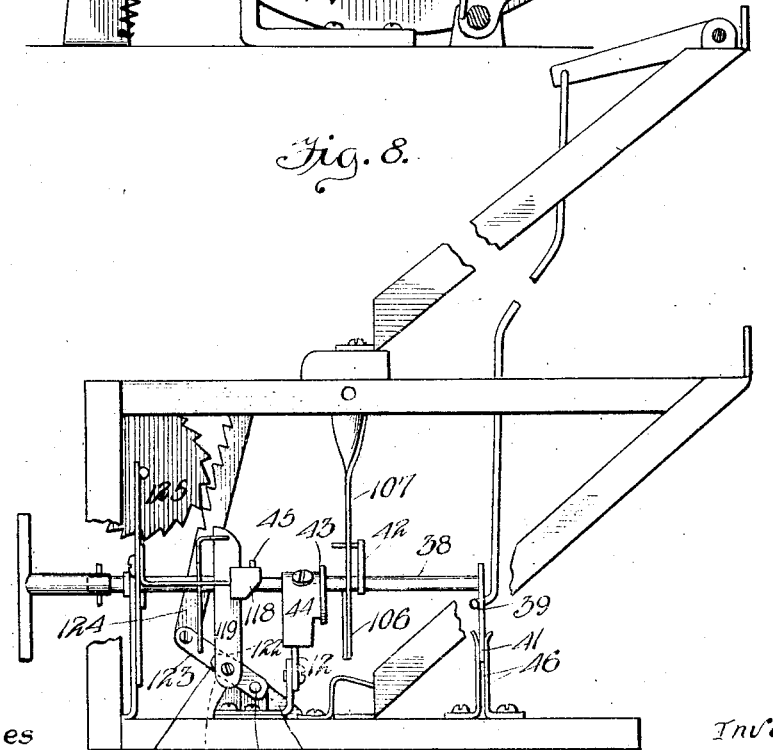
Figure 17:
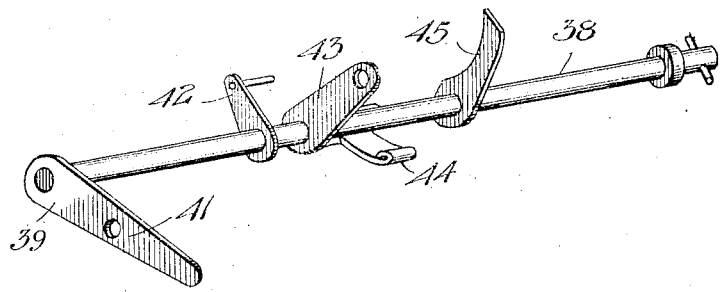
Figure 18:
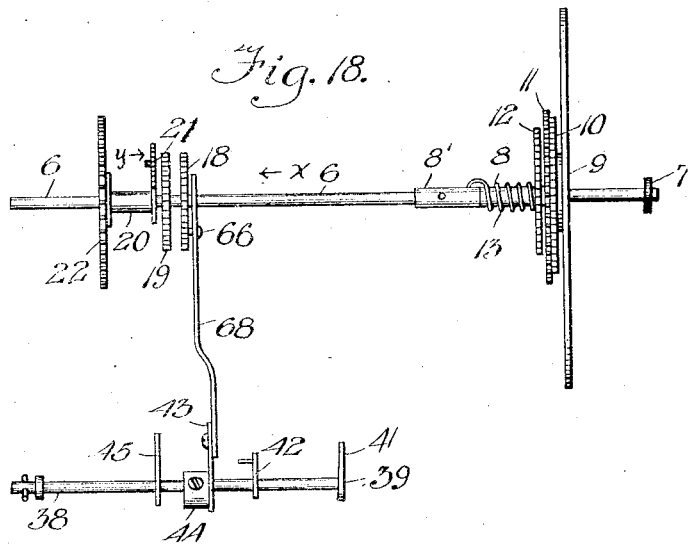

Figure 1 is a front elevation of the taximeter. Fig. 2 is a front elevation of the mechanism with the front of the casing removed, the visual exhibitor being removed. Fig. 3 is a diagrammatical view of the electrical connections and electrical circuits. Fig. 4 is a rear elevation of the taximeter, showing the starting, stopping and printing mechanism. Figs. 5, 6 and 7 are detail views of the recording and cash registering mechanism. Fig. 8 is a detail view of the rate setting mechanisms. Fig. 9 is a detail view of the waiting rate setting mechanism. Fig. 10 is a detail view of the visual tax exhibitor operating mechanism. Fig. 11 is a detail view of the cashing registering tape and ticket forming means. Fig. 12 is a detail view of the recording tape and its supply and record reel. Fig. 13 is a section through the main shaft and its gears and ratchets. Fig. 14 is a section through the main shaft, looking in the direction of arrow $x$, Fig. 18. Fig. 15 is a similar view looking in the direction of arrow $y$, Fig. 18. Fig. 16 is a detail of record tape feeding mechanism. Fig. 17 is a detail perspective view of the key-shaft removed from the casing, with parts of the different mechanisms controlled thereby. Fig. 18 is a top plan view of the key-shaft and main shaft, being in the position for completing a circuit.

Referring to the drawings,—the numeral 1 designates a casing, whose front 2, is provided with the clock receiving aperture 3, the cents indicating dial 4' of the visual exhibitor and the dollar exhibiting aperture 4, of said visual exhibitor.

Through the opening 5, passes the end of the main shaft 6, upon which is removably mounted the cents indicating hand or pointer 7. Surrounding and rotatable upon the end of the shaft and carried in the rear of the front 2 is a stationary sleeve 8, upon which is keyed to and mounted the dollar exhibiting disk or circular plate 9, the operating ratchet 10, the operating gear or pinion 11, and the assisting or retarding ratchet 12. The coiled spring 13 has one terminal connected to the sleeve 8', which is fast to the shaft 6, Figs. 13 and 18, and the other to the ratchet 12, so that the exhibiting disk is automatically returned to 0, the stop 14 carried by the periphery of the disk 9, abutting the stop 15 of the casing to limit the movements of the disk 9.

The main shaft 6 has its rear end journaled in the standard 16 so that its rear end 6', projects to the rear of the standard and carries the lever 17, while upon the shaft just within the standard are the two ratchets 18 and 19, the teeth of which are oppositely arranged.

To the rear of the two circular ratchets 18 and 19, Figs. 13, 14, 15 and 18, is journaled a sleeve 20, which carries the segmental "set rate charging ratchet" 21, a coiled spring 21', being connected to the sleeve and segmental ratchet. Near the extreme rear end of the main shaft 6 is keyed the large pinion or gear 22, Figs. 4, 5, 6 and 7 which at all times meshes with the large pinion or gear 23, which carries the smaller pinion or gear 24 therewith, both of the gears 23 and 24 being rotatably mounted upon the reduced portion 25' of the auxiliary shaft 25, which is journaled in the frame of the machine directly in alinement with and above the main shaft 6. This smaller gear 24 meshes at all times with the gears 26 and 27, respectively, of the cents registering type wheels 28 and 29, respectively, of the recording and cash registering mechanisms 30 and 31, respectively, and it will thus be seen that simultaneously with the movement of the indicating pointer 7, these cents recording type wheels are moved, or in other words these type wheels are at all times in "step" or synchronism with the point 7. Keyed upon the extreme rear end of the shaft 25, is the large gear or pinion 32, which at all times meshes with the recording gear 33 and the cashing registering gear 34, and these gears 33 and 34 are keyed respectively to the recording, dollar and cash registering type wheels 35 and 36, respectively, so that as the shaft 25 is operated by the movement of the dollar exhibiting disk 9, the pinion 11, meshing with the large pinion 37, upon the forward end of the shaft 25, will transmit motion to the shaft 25 and thus operate the dollar type wheels of both mechanisms in step or synchronism with the dollar exhibing disk 9.

Mounted in the casing's frame, is the main key-shaft 38, through the medium of which the mechanism is set in motion. Upon this shaft is mounted the forward lever 39, which is operably connected with the "for hire" and "time rate" signal 40, the extreme end 41, of this lever forming an electrical circuit to set the electrical control in motion, as will presently appear. Also carried by the key-shaft is the stop 42, the crank arm 43, the cam 44, and the shaft finger 45, each one of which has its special work.

As the shaft is turned toward the center of the casing, the signal is turned down, showing that the vehicle is hired, and at the same time, the crank arm 43 is moved toward the center of the machine, this movement thereof, pushing the catch 68, so that its curved end having the kerf 67, pushes the pin or abutment 66, thus rotating the main shaft 6, a quarter of a circle, through the medium of the ratchet 18. This operation causes the pointer 7 to indicate the "set" rate charge of 50 cents, the segmental ratchet 21 by reason of the spring 21', then being in the position as shown in Fig. 15, or as preventing the pawl 63, from engaging the teeth of the ratchet 18. Thus as the pawl 63 is operated, the teeth of the segmental ratchet being beyond those of the ratchet 18, and preventing the pawl upon its upward movement from engaging the teeth of the ratchet 18 the segmental ratchet 21 is operated, and when it has been moved a quarter circle, the pawl 63, is permitted to engage the next tooth of the ratchet 18, and the shaft 6, with its pointer 7, is again operated until the pointer indicates 00. The end 41 of the lever 39, while the crank 43 operates the shaft 6 engages the contact plates 46, completing a circuit through the wire 47, post 48, and batteries 49, thence to the post 50, wire 51, electro-magnets 52, wire 53, pivoted contact 54, the running time contact plate 55, wire 56, contacts 57, contact arm 58, the minute hand shaft 59, where the circuit is grounded through the clock 60, and the metal casing of the machine, to which the clock and key-shaft are uninsulated from or grounded. This circuit is clearly shown in Fig. 3. It will thus be seen that as the minute hand moves, it carries with it the contact arm 58, which at every predetermined time, engages one of the contacts 57, Figs. 3 and 4, completing the above circuit and energizing the electro-magnet 52, which in turn operates its armature 61, and also the lever 62, which is carried by the armature 61, and has pivoted upon its extreme end the pawl 63. The pawl 63 is raised upwardly and inwardly toward the ratchet 18 and segmental ratchet 21, the hooked arm 63', carried by the armature 61, being also moved simultaneously and placed in the path of the teeth of the ratchet 19, thus preventing the pawl 63 from moving the ratchet 18 and therefore the main shaft, a greater distance than one tooth of the ratchet 18, at each energization of the electro-magnet 52. This pawl, as above set forth, operates the "set" rate charging segmental ratchet 21, for a quarter of a circle, after which, it is in engagement with the teeth of the ratchet 18, and thereby operates the ratchet 18, one tooth at each energizing of the electro-magnet 52, or until the pointer 7 indicates 00 on the visual cents exhibitor, this action also operating simultaneously the cents type wheels. To hold the hooked end of the pawl 63 toward the ratchet 18, I employ the spring 63$^a$, while to limit the inward movement of the pawl, I employ the strip 63$^b$, which is rigidly carried by the armature 61, being connected to the pawl 63, by means of the slot and pin connection 63$^c$, Fig. 15.

To prevent the main shaft from having a retrograde movement during the return of the pawl 63, Figs. 2, 13, 14, 15 and 18, I employ the oppositely engaging pawl 64 which engages the ratchet 18, and to prevent the main shaft from being returned too far by its spring 65 which surrounds the main shaft 6, and has its terminals made fast to the ratchet 18 and the frame of the electromagnet 74, Fig. 2, respectively, I provide the abutment 66 upon the ratchet 18, which engages the kerf 67, of the catch 68, which is pivotally and operatively secured to the crank arm 43 of the key-shaft 38.

When the main shaft has been rotated so that the pointer 7 indicates 00, or rather when it would reach a total of $1.00, the lever (or crank) 17, abuts the pin 69, pushing the link 70, and its lever 71, so that the insulated end 72, of the lever 71, bears down upon the end of the spring contact plate 73. This action closes a circuit, Fig. 3 which operates the electromagnet 74, which in turn operates its armature 75, Figs. 2, 10, 14 and 18 carrying the lever 76, which carries the spring actuated pawl 77 and catch or pawl 78, the pawl 137, being the retrograde-movement-preventing pawl for the ratchet 10. This action causes the pawl 77 to operate the ratchet wheel 10, which in turn operates the dollar exhibiting disk 9, the pawl 78 engaging the retarding or arresting ratchet 12, so as to prevent the disk 9 from slipping or being moved too far. This action operates the shaft 25 and the dollar type wheel actuating gear, so that the proper amount of dollar type are directly at the lowermost point of the wheels and exactly tallies with the amount exhibited by the disk 9, through the aperture 4. When the armature 75 is thus moved by the electromagnet, the crank 79, Fig. 14 also carried by the armature 75, moves the link 80, which in turn operates the crank 81, carried by the short shaft 82, and as this shaft carries the double crank 83, Figs. 14 and 15 which in turn has its upper end 84, pivotally connected to the retarding pawl 85, of the ratchets 18 and 19, the said retarding pawl 85, is lifted, so that its two pins 86 and 87, are disengaged from said ratchets 18 and 19, and the main shaft is thus released so that its spring 65 returns the main shaft and the cents type wheels and the pointer 7 to 0. At this point the lever 17 releases the pin 69, and engages the pin 88, of the bar 89, pushing the bar 89 and thus moving the lever 71, so that its contact end 72 releases the spring contact plate 73, and the circuit is open. This circuit as closed by the lever 71, is clearly shown in diagram in Fig. 3, and consists of the contact plate 73, the contact point 90, wire 91, electromagnet 74, wire 93, post 94, batteries 49, post 95, wire 96, and the plate 73.

If at anytime during the hiring of the vehicle, the passenger desires to stop and yet not discharge the vehicle, the chauffeur or driver of the vehicle operates the key 97, turning the shaft 98, whose short crank 99, operates the "waiting" time signal 100, and at the same time moves the contact 54, from engagement with the plate 55, and into engagement with the contact plate 101, thus switching the circuit through the plate 101, wire 102, contacts 103, the short contact arm 104, carried by the minute hand shaft 59, is grounded through the clock and shaft 38, and continues through 39, 41, 46 and wire 47, post 48, batteries 49, post 50, wire 51, electromagnet 52, wire 53 and pivoted contact 54. It will thus be seen that the computer A, which term I give the circular disk of insulation, and which is secured to the rear of the clock casing, is provided with two sets of contacts 57 and 103, and as the contacts 103 are of a lesser number, being on a smaller circle, the circuit is operated at longer intervals, thus operating the main shaft and the cents indicating pointer and type wheels, so that the charge for the "waiting" time is less than a charge for "running" time. When the passenger again enters the vehicle and the vehicle moves off, the driver or chauffeur operates the key 97, and the "waiting" time signal, switching the pivoted contact 54 from contact plate 101 to contact plate 55, at which point it remains.

When the passenger has reached the end of his journey the driver operates the key shaft 38, so that the point 41 disengages the plates 46, thus breaking the circuit and stopping the operation of the exhibiting and type mechanisms. The visual exhibitor now shows the exact amount of ride, and the driver continues to turn the shaft 38, the stop 42, engaging the hook 106, pulling the lever 107, operating the crank 108, which in turn oscillates the shaft 109, and simultaneously raises the two arms 110 and 111, each one of which carries the printing plates 112 and 113, respectively, which in turn press their respective cash registering and recording tapes 114 and 115, against the printing ribbon 116 and the proper type of the cash registering and recording type wheels. As the shaft 38 is continued to move in this direction, the stop 42 releases the hook 106, allowing the spring 117, to return the shaft 109 and its plates 112, 113 to normal position. As the shaft 38 is moved farther, the finger 45, engages the lug 118, pushes down the plate 119, whose lower end is pivoted to the crank 120, this action moving the crank and its shaft 121, whose small crank 122, engages the pin 122', upon the lever 123, upon whose outer end is carried the spring actuated toothed pawl 124, which is thus thrown into contact with the teeth of the ratchet wheel 125. This movement of the lever 123, places its abutment 126, in engagement with the pivoted cam 127 and raises the said cam, so that as the shaft 38 is rotated in the opposite direction in starting the mechanisms, the cam 44 of the shaft 38, will engage the cam 127, pushing the same downwardly, and simultaneously pushing the abutment 126 downwardly and the outer end of the lever 123 upwardly. This action pushes the ratchet pawl upwardly operating the ratchet wheel 125, and revolving the spool B so that the record tape is wound upon the spool, and there retained.

The cash registering tape has its end projecting out of the rear of the casing, over and above the paper cutting edge C, of the tape guide, so that the driver or chauffeur pulls this tape outwardly until the amount printed thereon is visible, at which time the coupon is torn off. The passenger then examines the amount printed upon the coupon, and sees that the amount tallies with the visual exhibitor, paying the amount and retaining the coupon as a receipt. The tapes are carried upon the spools D and E, which are removably mounted within the standards $a$ and $b$.

After the chauffeur or driver has received his cash, the push pin 128 is pushed in, pressing upon the arm 129, this operates the shaft 130, whose lugs 131 and 132 engage and the two pawls 64 and 133, raise them from engagement with the ratchets 18 and 19 and the segmental ratchet 21, thus releasing the main shaft so that its spring 65 returns the cents exhibiting pointer 7, and the cents printing type wheels, while the crank arm 134 upon the forward end of the shaft 130, has its pins 135 and 136 placed in engagement with the holding spring actuated or retrograde movement preventing pawl 137 and the operating pawl 77, and simultaneously disengages these two pawls from the ratchet wheel 10, thus releasing the dollar exhibiting disk 9, whose spring 13 returns the disk to 0, and simultaneously returns the shaft 25, and consequently the dollar type wheels to 0. Thus the machine is ready for the next passenger.

A sum total adder may be used in connection with the record tape mechanism, whereby at a glance the total amount made during the day by the vehicle may be totaled.

It will thus be seen that I provide a taximeter, which has visual charge exhibitor, recording tape mechanism, cash registering and receipt coupon printing mechanism, and means whereby a disk of insulation having two series of metal contacts is controlled to make electrical circuits at predetermined times, to operate the various mechanism for "running" or "waiting" time rates, as may be desired.

What I claim, as new, is:—

1. In a taximeter, the combination with a clock, and an indicating mechanism, of means in operative relation with said clock for operating said mechanism at two different rates, comprising a source of electrical energy, circuits connecting said source with said mechanism, a ring of insulation carrying two series of contacts, and two separate contacts carried by the minute hand arbor of the clock and rotatable therewith, the closure of said circuits being controlled by said series of contacts and said contacts of the arbor.

2. In a taximeter, the combination with a clock, mechanism for registering the fare, mechanism for printing a receipt of fare paid by passenger, and mechanism for making a permanent record of cash received, of means in operative relation with said clock for operating said mechanisms at two different rates, comprising a source of electrical energy, circuits connecting said source with said mechanisms, and two separate contacts carried by the minute hand arbor of the clock and rotatable therewith, the closure of said circuits being controlled by said series of contacts and said contacts of the arbor.

3. In a taximeter, the combination with a clock, and an indicating mechanism, of means in operative relation with the clock for operating said mechanism at two different rates, comprising a source of electrical energy, circuits connecting said source with said mechanism, a ring of insulation carrying two series of contacts, two separate contacts carried by the minute hand arbor of the clock, and rotatable therewith, and means for causing one and only one circuit through its respective series of contact and arbor contact to be energized at a time.

4. In a taximeter, the combination with a clock, mechanism for registering the fare, mechanism for printing a receipt of fare paid by passenger, and mechanism for making a permanent record of cash received, of means in operative relation with the clock for operating said mechanism at two different rates, comprising a source of electrical energy, circuits connecting said source with said mechanisms, a ring of insulation carrying two series of contacts, two separate contacts carried by the minute hand arbor of the clock and rotatable therewith, and means for causing one and only one circuit through its respective series of contacts and arbor contact to be energized at a time.

5. In a taximeter, the combination with a clock, and an indicating mechanism, of means for operating said mechanism at two different rates through the medium of said clock, comprising a source of electrical energy, circuits connecting said source with said mechanism, a ring of insulation carrying two series of contacts, two separate contacts carried by and rotatable with the minute hand arbor of the clock, means for causing one and only one circuit through its respective series of contacts and arbor contact to be energized at one time, and means for operating the indicating mechanism to indicate an initial fare and also to close the circuit between either series of contacts and its arbor contact.

6. In a taximeter, the combination with a clock, mechanism for registering the fare, mechanism for printing a receipt of fare paid by passenger, and mechanism for making a permanent record of cash received, of means for operating said mechanisms at two different rates through the medium of the clock, comprising a source of electrical energy, circuits connecting said source with said mechanism, a ring of insulation carrying two series of contacts, two separate contacts carried by and rotatable with the minute hand arbor of the clock, means for causing one and only one circuit through its respective series of contacts and arbor contact to be energized at one time, and means for operating the indicating mechanism to indicate an initial fare and also to close the circuit between either series of contacts and its arbor contact.

7. In a taximeter, the combination with a clock, and an indicating mechanism, of means for operating said mechanism at two different rates through the medium of said clock, comprising a source of electrical energy, circuits connecting said source with said mechanism, a ring of insulation carrying two series of contacts, two separate contacts carried by and rotatable with the minute hand arbor of the clock, means for causing one and only one circuit through its respective series of contacts and arbor contact to be energized at one time, and a shaft adapted to be manually operated to move the indicating mechanism to exhibit an initial fare and simultaneously close the circuit between either series of contacts and its arbor contact.

8. In a taximeter, the combination with a clock, mechanism for registering the fare, mechanism for printing a receipt of fare paid by passenger, and mechanism for making a permanent record of cash received, of means for operating the mechanisms at two different rates through the medium of said clock, comprising a source of electrical energy, circuits connecting said source with said mechanisms, a ring of insulation carrying two series of contacts, two separate contacts carried by and rotatable with the minute hand arbor of the clock, means for causing one and only one circuit through its respective series of contacts and arbor contact to be energized at a time, and a shaft adapted to be manually operated to move the registering mechanism to register an initial fare and simultaneously close the circuit between either series of contacts and its arbor contact.

9. In a taximeter, the combination with a clock, and an indicating mechanism, of means in operative relation with said clock for operating said mechanism at two different rates, comprising a source of electrical energy, circuits connecting said source of electrical energy, a ring of insulation carrying two series of contacts, two separate contacts carried by the minute hand arbor of the clock and rotatable therewith, and a switch for closing one and only one of the circuits at a time.

10. In a taximeter, the combination with a clock, mechanism for registering the fare, mechanism for printing a receipt of fare paid by passenger, and mechanism for making a permanent record of cash received, of means in operative relation with said clock for operating said mechanisms at two different rates, comprising a source of electrical energy, a ring of insulation carrying two series of contacts, two separate contacts carried by the minute hand arbor of the clock and rotatable therewith, and a switch for closing one and only one of the circuits at a time.

11. In a taximeter, the combination with a clock, a main shaft, and an indicating mechanism operably connected with said main shaft, of means in operative relation with the clock for operating the main shaft at two different rates, comprising a source of electrical energy, circuits connecting said source of electrical energy with said main shaft and indicating mechanism, a ring of insulation carrying two series of contacts, and two separate contacts carried by the minute hand arbor of the clock and rotatable therewith, said circuits being controlled by said series of contacts and said contacts of the arbor.

12. In a taximeter, the combination with a clock, a main shaft, mechanism for registering the fare, mechanism for printing a receipt of fare paid by passenger, and mechanism for making a permanent record of cash received, all of said mechanisms being operably connected to the main shaft, of means in operative relation with the clock for operating the main shaft and mechanisms at two different rates, comprising a source of electrical energy, circuits connecting said source of electrical energy with said main shaft and mechanisms, a ring of insulation carrying two series of contacts, and two separate contacts carried by the minute hand arbor of the clock and rotatable therewith, said circuits being controlled by said series of contacts and said contacts of the arbor.

13. In a taximeter, the combination with a clock, a main shaft, and an indicating mechanism operably connected with said main shaft, of means in operative relation with the clock for operating the main shaft and the mechanism at two different rates, comprising a source of electrical energy, circuits connecting said source of electrical energy with said main shaft and mechanism, a ring of insulation carrying two series of contacts, two separate contacts carried by the minute hand arbor of the clock, and rotatable therewith, and means for causing one and only one circuit through its respective series of contacts and arbor contact to be energized at a time.

14. In a taximeter, the combination with a clock, a main shaft, mechanism for registering the fare, mechanism for printing a receipt of fare paid by passenger, and mechanism for making a permanent record of cash received, of means in operative relation with the clock for operating the main shaft and the mechanisms at two different rates, comprising a source of electrical energy, circuits connecting said source of electrical energy with said main shaft and mechanisms, a ring of insulation carrying two series of contacts, two separate contacts carried by and rotatable with the minute hand arbor of the clock, and means for causing one and only one circuit through its respective series of contacts and arbor contact to be energized at a time.

15. In a taximeter, the combination with a clock, a main shaft, and an indicating mechanism operably connected with said main shaft, of means for operating the main shaft and mechanism at two different rates through the medium of said clock, comprising a source of electrical energy, circuits connecting said source of electrical energy with said main shaft and mechanism, a ring of insulation carrying two series of contacts, two separate contacts carried by and rotatable with the minute hand arbor of the clock, means for causing one and only one circuit through its respective series of contacts and arbor contact to be energized at a time, and means for operating the main shaft to cause the mechanism to indicate the initial fare and also to close the circuit between either series of contacts and its arbor contact.

16. In a taximeter, the combination with a clock, a main shaft, mechanism for registering the fare, mechanism for printing a receipt of fare paid by passenger, and mechanism for making a permanent record of cash received, of means for operating said main shaft and mechanisms at two different rates through the medium of said clock, comprising a source of electrical energy, circuits connecting said source of electrical energy with said main shaft and said mechanisms, a ring of insulation carrying two series of contacts, two separate contacts carried by and rotatable with the minute hand arbor of the clock, means for causing one and only one circuit through its respective series of contacts and arbor contact to be energized at a time, and means for operating the main shaft and the mechanisms to indicate an initial fare and to simultaneously close a circuit between either series of contacts and its arbor contact.

17. In a taximeter, the combination with a clock, a main shaft, a key-shaft, means connected to the key-shaft and main shaft for operating the main-shaft, and an indicating mechanism operably connected with the main shaft, of means in operative relation with the clock for operating the main shaft at two different rates, comprising a source of electrical energy, circuits connecting said source of electrical energy with said main shaft and indicating mechanism, a ring of insulation carrying two series of contacts, two separate contacts carried by the minute hand arbor of the clock and rotatable therewith, said circuits being controlled by said series of contacts and said contacts of the arbor, and means carried by the key-shaft, whereby when the key-shaft is operated a circuit is completed through one series of contacts and its arbor contact and the main shaft is operated to cause the mechanism to indicate an initial fare.

18. In a taximeter, the combination with a clock, and an indicating mechanism, of means in operative relation with said clock for operating the mechanism at two different rates, comprising a source of electrical energy, two circuits connecting said source of electrical energy, a ring of insulation carrying two series of contacts, one to each circuit, two separate contacts, one to its respective series of contacts, carried by and rotatable with the minute hand arbor of the clock, a signal device for causing one and only one of the series of contacts and its arbor contact to be included in a circuit at a time, and manually operated means for closing either of the circuits so formed to start the mechanisms in operation.

19. In a taximeter, the combination with a clock, mechanism for registering the fare, mechanism for printing a receipt of fare paid by passenger, and means for making a permanent record of all cash received, of means in operative relation with said clock for operating the mechanisms at two different rates, comprising a source of electrical energy, two circuits connecting said source, a ring of insulation carrying two series of contacts, one to each circuit, two separate contacts, one to its respective series of contacts, carried by and rotatable with the minute hand arbor of the clock, a signal device for causing one and only one of the series of contacts and its arbor contact to be included in a circuit at a time, and manually operated means for closing either of the circuits so formed to start the mechanisms in operation.

20. In a taximeter, the combination with a clock, a main shaft, an indicating mechanism, a key-shaft, and co-acting means carried by the key-shaft and main shaft, whereby manual operation of the key-shaft will cause the indicating mechanism to indicate an initial fare, of means in operative relation with the clock for operating said mechanism at two different rates, comprising a source of electrical energy, circuits connecting said source with said mechanism, a ring of insulation carrying two series of contacts, two separate contacts carried by and rotatable with the minute hand arbor of the clock, said circuits being controlled by said series of contacts and the arbor contacts, and means carried by the key-shaft and operable simultaneously with the initial fare indicating means for closing either one of the circuits.

21. In a taximeter, the combination with a clock, a main shaft, mechanism for registering the fare, mechanism for printing a receipt coupon of fare paid by passenger, mechanism for making a permanent record of cash received, a key-shaft, and co-acting means carried by the key-shaft and main shaft, whereby manual operation of the key-shaft will operate the main shaft and mechanisms to indicate an initial fare, of means in operative relation with the clock for operating said mechanisms electrically at two different rates, comprising a source of electrical energy, circuits connecting said source of electrical energy with said mechanisms, a ring of insulation carrying two sets of contacts, two separate contacts carried by and rotatable with the minute hand arbor of the clock, said circuits being controlled by said sets of contacts and the arbor contacts, and means carried by the key-shaft and operable simultaneously with the initial fare operating means for closing a circuit to start the mechanisms in operation.

In testimony whereof I affix my signature in presence of two witnesses.

JOHN G. MacPHERSON.

Witnesses:
E. H. PARKINS,
D. P. MOORE.